United States Patent
Croak et al.

(10) Patent No.: US 7,231,210 B1
(45) Date of Patent: Jun. 12, 2007

(54) METHOD AND APPARATUS FOR AUTOMATICALLY GENERATING CALL FLOW TEST SCRIPTS

(75) Inventors: Marian Croak, Fair Haven, NJ (US); Hossein Eslambolchi, Los Altos Hills, CA (US)

(73) Assignee: AT&T Corp., New York, NY (US)

( * ) Notice: Subject to any disclaimer, the term of this patent is extended or adjusted under 35 U.S.C. 154(b) by 160 days.

(21) Appl. No.: 11/025,443

(22) Filed: Dec. 29, 2004

(51) Int. Cl.
*H04B 17/00* (2006.01)
*H04Q 7/20* (2006.01)

(52) U.S. Cl. ............. 455/423; 455/424; 455/425; 455/67.11; 455/67.13; 455/67.14

(58) Field of Classification Search .. 455/115.1–115.4, 455/423–425, 67.13, 67.14, 67.15, 64.16, 455/67.17, 67.11, 8–10, 11.1, 560–561, 550.1, 455/405–408, 418–421, 414.1–414.2, 422.1, 455/453, 466, 502–512, 517, 403, 224.1; 379/1.01–33, 201.02–201.03; 714/25–57, 714/699–717, 742–763; 702/108, 81–84, 702/118–126; 717/114–116, 128, 155
See application file for complete search history.

(56) References Cited

U.S. PATENT DOCUMENTS

| | | | | |
|---|---|---|---|---|
| 5,940,472 A | * | 8/1999 | Newman et al. | 379/10.02 |
| 6,091,802 A | * | 7/2000 | Smith et al. | 379/10.03 |
| 6,148,277 A | * | 11/2000 | Asava et al. | 703/22 |
| 6,167,534 A | * | 12/2000 | Straathof et al. | 714/38 |
| 6,560,564 B2 | * | 5/2003 | Scarlat et al. | 702/186 |
| 7,020,441 B2 | * | 3/2006 | Adams et al. | 455/67.11 |
| 7,047,446 B1 | * | 5/2006 | Maurer et al. | 714/38 |
| 2003/0046626 A1 | * | 3/2003 | Hand et al. | 714/738 |
| 2003/0212561 A1 | * | 11/2003 | Williams et al. | 704/270.1 |
| 2004/0008825 A1 | * | 1/2004 | Seeley et al. | 379/32.01 |
| 2004/0160896 A1 | * | 8/2004 | Luna et al. | 370/235 |
| 2006/0039538 A1 | * | 2/2006 | Minnis et al. | 379/1.01 |
| 2006/0117222 A1 | * | 6/2006 | Shen et al. | 714/38 |

* cited by examiner

*Primary Examiner*—Meless Zewdu (57) ABSTRACT

The invention comprises a method and apparatus for generating at least one test script for testing at least one service. Specifically, the method comprises obtaining information associated with at least one call flow associated with the at least one service, automatically constructing a call flow representation using the information, and automatically generating the at least one test script, wherein the at least one test script is generated using at least a portion of the call flow representation.

10 Claims, 5 Drawing Sheets

FIG. 5

METHOD AND APPARATUS FOR AUTOMATICALLY GENERATING CALL FLOW TEST SCRIPTS

FIELD OF THE INVENTION

The invention relates to the field of communication networks and, more specifically, to call flow test script generation.

BACKGROUND OF THE INVENTION

As service providers continue to deploy and upgrade network infrastructures in support of voice-over-Internet-Protocol (VOIP) traffic, network infrastructures are rapidly becoming more complex. In addition to the potentially large number of deployed network components, the network infrastructures are complex in that IP network components are increasingly being deployed not only in support of IP-to-IP communications, but for interfacing to other networks (e.g., Publicly Switched Telephone Networks) as well. This situation is exacerbated by use of network components provided by numerous equipment vendors, especially since some network components are still relatively undeveloped with respect to reliability and scale.

In order to certify proposed network services, service providers often subject the proposed network services to a myriad of call flows to ensure that the proposed network services work for every potential call flow requested by customers in the production network. Unfortunately, identification of every potential call flow is quite difficult. Furthermore, development of test scripts for testing the call flows is complex. As such, service provider call flow testing personnel are often unable to perform the extensive evaluation of complex call flows that may occur in the production environment due to a lack of insufficient processes for performing such extensive evaluation.

Accordingly, a need exists in the art for a method and apparatus for generating at least one call flow test script for certifying at least one service prior to deployment of the service for supporting customer traffic.

SUMMARY OF THE INVENTION

In one embodiment, the invention comprises a method and apparatus for generating at least one test script for testing at least one service. Specifically, the method comprises obtaining information associated with at least one call flow associated with the at least one service, automatically constructing a call flow representation using the information, and automatically generating the at least one test script, wherein the at least one test script is generated using at least a portion of the call flow representation.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention is discussed in the context of an Internet Protocol (IP) network architecture comprising a plurality of routers and a plurality of user terminals; however, the methodology of the invention can readily be applied to other network architectures and technologies. An IP network is broadly defined as a network that uses Internet Protocol to exchange data packets. A VOIP network is broadly defined as a network that is capable of carrying voice signals as packetized data over an IP network. A PSTN is broadly defined as a concatenation of circuit-switched telephone systems for carrying voice signals.

In general, the present invention enables a service provider to design a call flow for testing at least one network service, to construct a representation of the call flow, and to generate at least one test script using the call flow representation. By enabling a service provider to design complex call flows using graphical representations of various service features, service interactions, call flow messages, call handling treatments, and like parameters, the present invention affords the service provider significant flexibility in designing numerous call flows for testing numerous potential network services. As such, the present invention obviates the need for a service provider to assume the risks (e.g., of uncovering customer-impacting service problems in a live network) associated with deploying untested network services.

Figure 1:
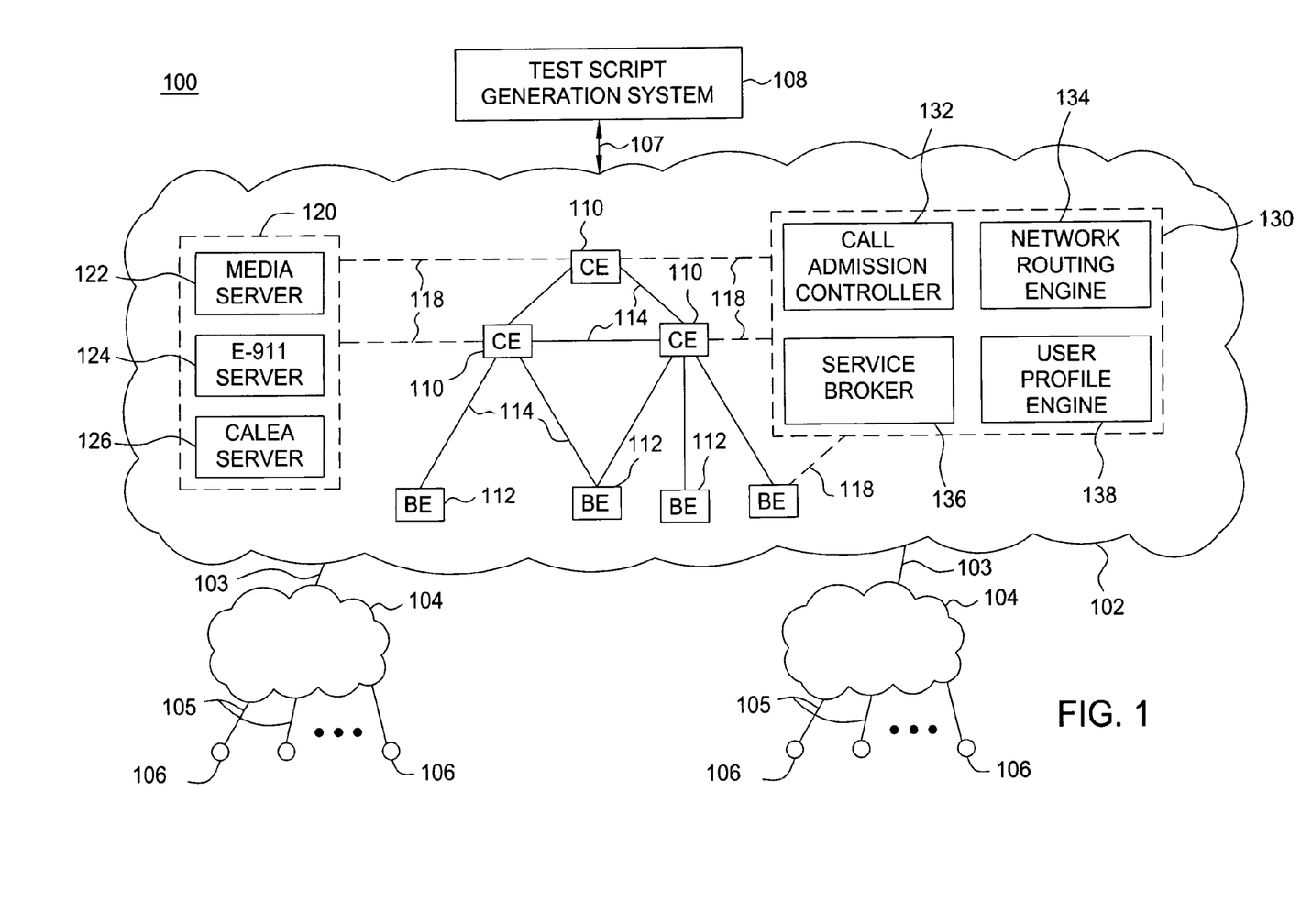
FIG. 1 depicts a high level block diagram of an Internet Protocol (IP) network architecture.

FIG. 1 depicts a high level block diagram of an Internet Protocol (IP) network architecture. Specifically, IP network architecture 100 of FIG. 1 comprises IP network 102, a plurality of access networks (ANs) 104 (collectively, ANs 104), a plurality of network endpoints 106 (collectively, network endpoints 106), and a test script generation system (TSGS) 108. The IP network 102 comprises a plurality of core elements (CEs) 110 (collectively, CEs 110), a plurality of border elements (BEs) 112 (collectively, BEs 112), a plurality of resource servers (RSs) 120 (collectively, RSs 120), and a plurality of service elements (SEs) 130 (collectively, SEs 130). The CEs 110, BEs 112, RSs 120, and SEs 130 are collectively denoted as network components.

In general, the CEs 110 comprise network elements (such as routers, switches, and the like) over which network traffic is carried between the BEs 112. In one embodiment, at least a portion of the CEs 110 may comprise call control elements (CCEs) for managing and interacting with the BEs 112 (e.g., monitoring respective congestion levels of the BEs 112), setting up and tearing down call legs in IP network 102, enforcing various routing policies, instructing the BEs 112 to redirect media channels associated with a particular call to a different destination, communicating with other IP networks (not depicted), and providing like functionality.

The BEs 112 may comprise network elements (such as routers, switches, and the like) through which various ANs (illustratively, ANs 104) and network endpoints connect toa service provider network (illustratively, IP network 102).

In one embodiment, the BEs 112 may perform functions such as routing, call admission control (CAC), media control, security, signaling, and the like. For example, a BE may translate between Session Initiation Protocol (SIP) and various access protocols, enforce security to prevent unauthorized access to IP network 102, enforce admission policies in accordance with CAC (such as call gapping, call limiting, and the like), detect Dual Tone Multi-Frequency (DTMF) and like in-band user requests, redirect media streams, and the like.

In one embodiment, at least one of the BEs 112 may comprise a network gateway BE for controlling traffic between a circuit-switched network and packet-switched IP network 102. In another embodiment, at least one of the BEs 112 may comprise a Media Gateway Control Protocol (MGCP) BE for controlling traffic between a MGCP network and IP network 102. In another embodiment, at least one of the BEs 112 may comprise a SIP BE for controlling network traffic between a SIP-based network and IP network 102. In another embodiment, at least one of the BEs 112 may comprise a H.323 BE for controlling traffic between a H.323 customer premise equipment (CPE) gateway network and IP network 102.

As depicted in FIG. 1 the ANs 104 communicate with IP network 102 via a respective plurality of communication links (CLs) 103 (collectively, CLs 103). The network endpoints 106 communicate with the ANs 104 via a respective plurality of access communication links (ACLs) 105 (collectively, ACLs 105). As described herein, the ANs 104 may comprise a PSTN, a digital subscriber line (DSL) network, a cable network, a partner IP network and like access networks. As such, the network endpoints 106 may comprise TDM phones, IP phones, SIP phones, computers, and like network endpoints for initiating and receiving phone calls over IP network 102.

As depicted in FIG. 1, the RSs 120 comprise a media server 122, an E-911 server 124, and a CALEA server 126. The media server 122 may handle and terminate media streams, providing functions such as announcement, DTMF, automatic speech recognition (ASR), call bridging, and like functionality. The E-911 server 124 may route emergency calls to appropriate Public Safety Answering Points (PSAPs). The CALEA server 126 may intercept various communications for law enforcement. Although not depicted, additional RSs may be deployed in IP network 102.

As depicted in FIG. 1, the SEs 130 comprise a call admission controller (CAC) 132, a network routing engine (NRE) 134, a service broker (SB) 136, and a user profile engine (UPE) 138. The CAC 132 may provide admission policy enforcement, capacity management, congestion control, network address translation (NAT), and like functionality. The NRE 134 may provide route information to the CEs 110 and BEs 112 for establishing call legs between source and destination BEs. The NRE 134 may translate network addresses to IP addresses. The SB 136 may provide addresses to CEs operating as CCEs. The UPE 138 maintains user profiles comprising user data (e.g., registered device information, presence information, and like user data).

Although three RSs and four SEs are depicted and described herein, those skilled in the art will appreciate that fewer or more RSs and SEs may be utilized by IP network 102 for providing various IP-based services. Similarly, although depicted as communicating with a portion of the CEs 110 and BEs 112, RSs 120 and SEs 130 may communicate with other network components within IP network 102, with the ANs 104, and with other networks and network components (not depicted). Furthermore, although depicted as physically centralized, it should be noted that at least a portion of the RSs 120 and SEs 130 may be physically and/or logically distributed across a variety of systems.

As depicted in FIG. 1, the CEs 110 and the BEs 112 communicate via a plurality of core communication links 114. Although not depicted, it should be noted that each of the CEs 110 may maintain respective SIP sessions with each of the BEs 112. Similarly, as depicted in FIG. 1, the RSs 120 and SEs 130 maintain a plurality of SIP sessions 118 with a portion of the CEs 110 and BEs 112. Although specific configurations of communication links and SIP sessions are depicted, those skilled in the art will appreciate that fewer or more communication links and SIP sessions may be used, and that the various network components and access networks may communicate via other associated networks and network equipment (not depicted).

As depicted in FIG. 1 and described herein, TSGS 108 comprises a system for obtaining information associated with at least one call flow, automatically constructing a call flow representation using the information, and automatically generating at least one test script, where the at least one test script is generated using at least a portion of the call flow representation. As such, in one embodiment, at least a portion of the methodologies of the present invention may be performed by TSGS 108. As depicted in FIG. 1, TSGS 108 communicates with IP network 102 via communication link 107. In one embodiment, TSGS 108 may communicate with IP network 102 via additional communication links and associated network equipment (not depicted).

Although a specific network topology is depicted and described with respect to FIG. 1, those skilled in the art will appreciate that the IP network architecture 100 of FIG. 1 may be implemented using a variety of network topologies without deviating from the scope of the present invention. As such, although specific numbers of ANs 104, network endpoints 106, CEs 110, BEs 112, RSs 120, and SEs 130 are depicted and described with respect to FIG. 1, it should be noted that fewer or more ANs 104, network endpoints 106, CEs 110, BEs 112, RSs 120, and SEs 130 may be deployed. Similarly, although one TSGS 108 is depicted, a plurality of TSGSs may be used for implementing the methodologies of the present invention.

Figure 2:
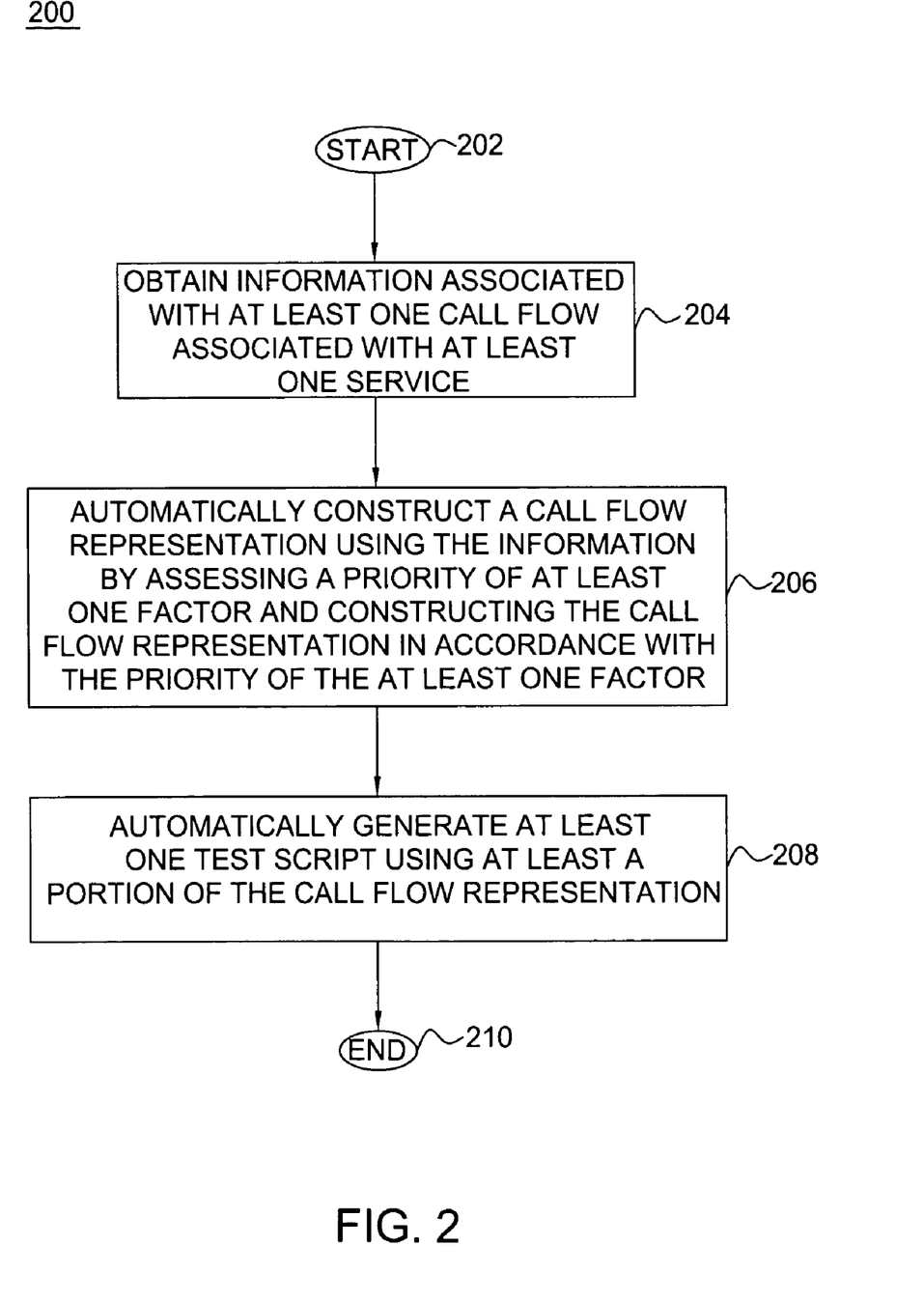
FIG. 2 depicts a flow diagram of a method according to one embodiment of the invention.

FIG. 2 depicts a flow diagram of a method according to one embodiment of the invention. Specifically, method 200 of FIG. 2 comprises a method for generating at least one test script for testing at least one service. The method 200 is entered at step 202 and proceeds to step 204. At step 204, information associated with at least one call flow associated with the at least one service is obtained. At step 206, a call flow representation is automatically constructed using the obtained information. In one embodiment, automatic construction may comprise assessing a priority of at least one factor and constructing the call flow representation in accordance with the priority of the at least one factor. At step 208, the at least one test script is automatically generated using at least a portion of the call flow representation. The method 200 then proceeds to step 210 where method 200 ends.

In one embodiment, automatic construction may comprise assessing a priority of at least one factor and constructing the call flow representation in accordance with the priority of the at least one factor. In another embodiment, automatic construction may comprise identifying at least one network endpoint associated with the at least one call flow, identifying at least one network component associated with the at least one call flow, and determining at least one call flow sequence comprising at least one call flow action, where the call flow sequence provides the at least one service to the at least one network endpoint using the at least one network component. In one embodiment, automatic generation may comprise processing the at least one call flow sequence for identifying at least one call flow action, adapting the at least one call flow action for forming at least one command, and organizing the at least one command for forming the at least one test script.

Figure 3:
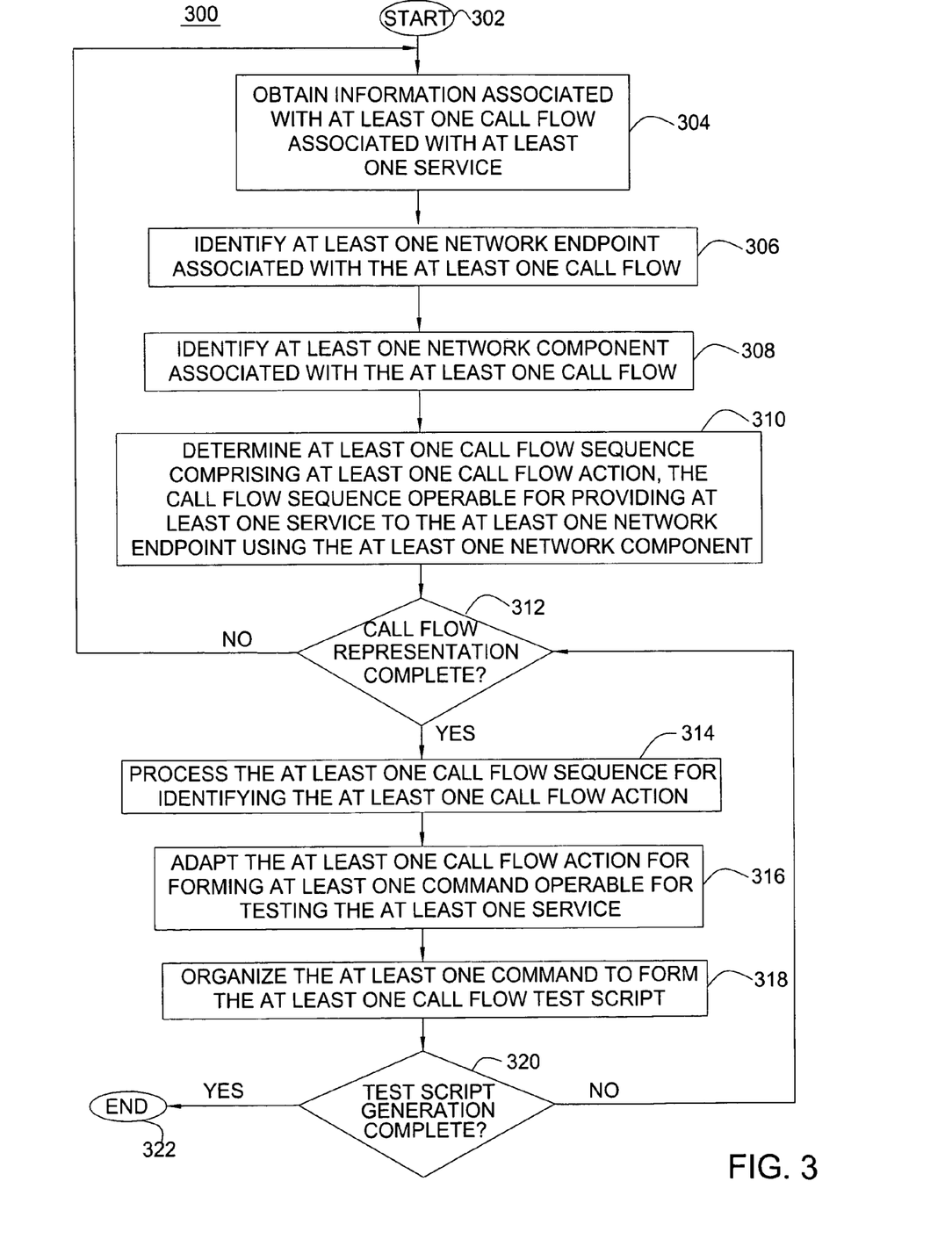
FIG. 3 depicts a detailed flow diagram of the method depicted in FIG. 2.

FIG. 3 depicts a detailed flow diagram of the method depicted in FIG. 2. As such, a single step as depicted in FIG. 2 may correspond to multiple steps as depicted in FIG. 3. Specifically, method 300 of FIG. 3 comprises a method for generating at least one test script for testing at least one service. Although depicted as being performed serially, those skilled in the art will appreciate that at least a portion of the steps of method 300 may be performed contemporaneously. The method 300 is entered at step 302 and proceeds to step 304.

At step 304, information associated with at least one call flow associated with the at least one service is obtained. In general, a call flow may comprise a sequence of actions performed during call setup, performed in response to network service requests by network endpoints, and the like. In one embodiment, a call flow may comprise at least one of: at least one call setup message and at least one call handling treatment. In one embodiment, the obtained information may comprise any information capable of being processed during automatic construction of a call flow representation. In one embodiment, the obtained information may comprise at least one network parameter, at least one service parameter, and at least one call flow parameter. In one embodiment, a call flow parameter may comprise at least one of: at least one call setup message, at least one call handling treatment, and like call flow parameters.

In one embodiment, the at least one network parameter may comprise at least one of: at least one network endpoint associated with a call (e.g., one of the network endpoints 106), at least one network component associated with a call (e.g., an ingress BE 116 and an egress BE 116 for carrying a call over IP network 102), and like network parameters associated with a call flow. In one embodiment, a network parameter comprises network information (e.g., network configuration information, network component information, network connectivity information, and like network information).

In one embodiment, the at least one service parameter may comprise at least one of: at least one network service type, at least one service message received and processed by a RS (e.g., one of the RSs 120) for providing a requested service, at least one service request response message initiated by a RS, at least one service message received and processed by a SE (e.g., one of the SEs 130) for providing a requested service, at least one service request response message initiated by a SE, at least one quality of service parameter, and like service parameters associated with the at least one service requested by a network endpoint.

In one embodiment, a call setup message may comprise a message between a network endpoint and a network component, a message between network components, and like exchanges associated with establishing calls, accessing network services, and the like. For example, a call setup message may comprise a message between a network endpoint and a network component (e.g., a message initiated from one of the network endpoints 106 to one of the BEs 116 for establishing a connection with another one of the network endpoints 106). In another example, a call setup message may comprise signaling between network components (e.g., SIP call setup signaling from a CE 110 to an egress BE 112 associated with a network endpoint to which the call was initiated).

In one embodiment, a call handling treatment may comprise at least one response associated with an identified network condition. In one such embodiment, a call handling treatment may comprise at least one response procedure associated with a network service request initiated by a network endpoint. In one example, a call handling treatment may comprise transferring a call setup request to a voicemail server in response to an indication that a called network endpoint is non-responsive (i.e., that the called user does not answer the incoming call). In another example, a call handling treatment may comprise establishing a session with CALEA server 126 upon determining that the call is initiated by a network endpoint for which call recordation is scheduled.

In one embodiment, at least a portion the information associated with a call flow may be received from at least one user via a user interface. For example, at least a portion of the information associated with the call flow may be obtained in response to actuation of various entry means via a user interface. For example, a user may select network endpoints between which a call is established using point-and-click operations. In another example, a user may select network elements over which the call is established using point-and-click operations. In another example, a user may select RSs and SEs for providing at least one service to the network endpoints. In another example, a user may apply service features to various network components by dragging-and-dropping graphical icons representative of the service features onto respective graphical icons representative of the network components.

In one embodiment, at least a portion of the information associated with a call flow may be retrieved from at least one local database, memory, and like storage components. In another embodiment, at least a portion of the information associated with a call flow may be received from at least one remote system. As such, information is obtained from at least one of a user interface, a local storage medium, a remote storage medium, and the like. In one embodiment, the obtained information may be stored in at least one of a memory, database, and like components for storing call flow information.

At step 306, at least one network endpoint associated with the at least one call flow is identified. In one embodiment, the at least one network endpoint may be identified using a call flow type associated with the at least one call flow. For example, generation of a call flow test script for testing call establishment between SIP phones using G.726 transcoding may result in selection of two network endpoints comprising SIP phones supporting G.726 transcoding. In another embodiment, the at least one network endpoint may be identified based on actuation of entry means by a user via a user interface. For example, a user may select two network endpoints using a point-and-click operation in a graphical user interface on which a network is displayed.

At step 308, at least one network component associated with the at least one call flow is identified. In one embodiment, the at least one network component may be identified using a call flow type associated with the at least one call flow. As described herein, a network component may comprise a BE, a CE, a RS, a SE, and like network components useful for completing call flows and supporting network service requests. For example, generation of a test script for testing call setup between two SIP phones may result in selection of two BEs associated with the respective SIP phones, a CE associated with the selected BEs, and a CAC (illustratively, CAC 132) for performing call admission control during call setup call flow processing. In another embodiment, the at least one network component may be identified based on actuation of entry means by a user via a user interface (e.g., using point-and-click operations in a graphical user interface).

At step 310, at least one call flow sequence is determined. In one embodiment, a call flow sequence is operable for providing at least one service to at least one network endpoint using at least one network component. In one embodiment, the at least one call flow sequence comprises at least one call flow action. At step 312, a determination is made as to whether automatic construction of the call flow representation is complete. If construction of the call flow representation is not complete, method 300 returns to step 304. If construction of the call flow representation is complete, method 300 proceeds to step 314.

It should be noted that automatic construction of a call flow representation may be performed according to steps 306, 308, and 310, as described herein. In one embodiment, a call flow representation may comprise a logically simulated call flow substantially similar to an actual call flow achieved in a physical network. In one embodiment, automatic construction of a call flow representation may comprise assessing a priority of at least one factor and constructing the call flow representation in accordance with the priority of the at least one factor. In one embodiment, the at least one factor may comprise at least one automatic construction factor, such as a service type, a call model, a call flow type, a reliability target, a cost target, and like factors.

In one embodiment, automatic construction factors may be assessed in order to prioritize the application of the automatic construction factors to the construction of a call flow representation. For example, the reliability target factor may be assigned the highest priority for service providers attempting to generate a comprehensive suite of call flow test scripts, while the cost target factor may be assigned a relatively low priority. On the other hand, for example, the cost target may be assigned the highest priority for a service provider attempting to generate a minimal suite of call flow test scripts, while the call flow type factor may be assigned a relatively low priority.

It should be noted that a plurality of automatic construction factors may be assessed during automatic construction of a call flow representation. For example, service type may be assessed first, from which an optimum number of network endpoints and an optimum number of network components may be determined (e.g., ten network endpoints and ten network components are required in order to comprehensively test a conference call service). The optimum number of network endpoints and optimum number of network components may be determined according to at least one service attribute relating the service type to an average number of network endpoints and an average number of network components.

Upon determination of the optimum number of network endpoints and optimum number of network components, the reliability target may be assessed next, from which a subset of the optimum number of network endpoints and optimum number of network components may be selected. For example, a reliability target of 80% may result in a determination that five of the ten identified network endpoints and seven of the ten network components may be used for generating a call flow representation. Upon determination of the number of network endpoints and number of network components required to support the 80% reliability target, the call flow type may be assessed next, from which the associated call flow actions required to implement the call flow may be determined.

As such, by prioritizing at least a portion of the automatic construction factors, and constructing the call flow representation by considering each of the automatic construction factors according to the assigned priority, processing may be performed for automatically constructing a call flow representation. Although described with respect to specific automatic construction factors, it should be noted that fewer or more automatic construction factors may be used. Similarly, although described above with respect to a specific priority order with which the automatic construction factors are assessed, automatic construction factors may be assessed in a variety of priority orders. In one embodiment, automatic construction of the call flow representation may further comprise generating a graphical representation of the call flow for display to the user via a graphical user interface.

At step 314, the at least one call flow sequence is processed for identifying the at least one call flow action. In one embodiment, a call flow action comprises at least one of: at least one call flow message and at least one call flow process. In one embodiment, a call flow message comprises at least one of: at least one call setup message and at least one call handling treatment. For example, in one embodiment, a simple call flow sequence for establishing a connection between two network endpoints may comprise a plurality of call flow actions. In this example, the plurality of call flow actions may comprise call flow message generation, call flow message transmission, and call flow message processing. In one embodiment, a call flow process comprises processing performed in response to at least one of: a call flow message, a call handling treatment, a call flow action, and the like.

In this example, a first call flow action may comprise generation of a call setup message by a calling network endpoint, and transmission of the call setup message to an ingress BE (illustratively, one of the BEs 112) associated with the calling network endpoint. A second call flow action may comprise receiving and forwarding the call setup message from the ingress BE to a CE (illustratively, one of the CEs 110). A third call flow action may comprise receiving and forwarding the call setup message from the CE to CAC 132 via one of the SIP sessions 118. A fourth call flow action may comprise a call flow process (i.e., processing the call setup message for determining an egress BE associated with the called network endpoint).

A fifth call flow action may comprise generation of an egress BE selection message, and transmission of the egress BE selection message from CAC 132 to the CE via one of the SIP sessions 118. A sixth call flow action may comprise receiving and processing the egress BE selection message for identifying the egress BE. A seventh call flow action may comprise forwarding the call setup message to the egress BE specified in the egress BE selection message. An eighth call flow action may comprise a call flow process (i.e., processing the call setup message for determining the called network endpoint). A ninth call flow action may comprise signaling the called network endpoint to provide an indication of an incoming call.

At step 316, the at least one call flow action is adapted for forming at least one command operable for testing the at least one service. In general, a command comprises a computer-readable instruction for performing at least one task. In one embodiment, a command comprises a computer-readable instruction for generating at least one call flow message, for processing at least one call flow message, for generating at least one call flow response message, and like commands associated with call flows, call handling treatments, call flow actions, call flow sequences, service parameters, and the like.

At step 318, the at least one command is organized to form the at least one test script. In one embodiment, ordering of the at least one command in a call flow test script may be performed according to the ordering of the associated call flow actions in that call flow sequence. At step 320, a determination is made as to whether automatic generation of the test script is complete. If generation of the test script is not complete, method 300 returns to step 312, at which point at determination is made as to whether automatic construction of the call flow representation is complete. If generation of the test script is complete, method 300 proceeds to step 322 where method 300 ends.

Although one simple call flow for establishing a connection between two network endpoints is described herein, the methodologies of the present invention may be utilized for automatic generation of test scripts for various other call flows. Such call flows may comprise conference call setup flows, voicemail access flows, call forwarding flows, call waiting flows, broadcast call flows, and like call flows. Furthermore, the methodologies of the present invention may be used for call flow test script generation for testing various other network features, network services, and the like, such as testing network endpoint transcoding capabilities, testing BE/CE routing and signaling capabilities, testing RS/SE service feature capabilities, and the like.

Figure 4:
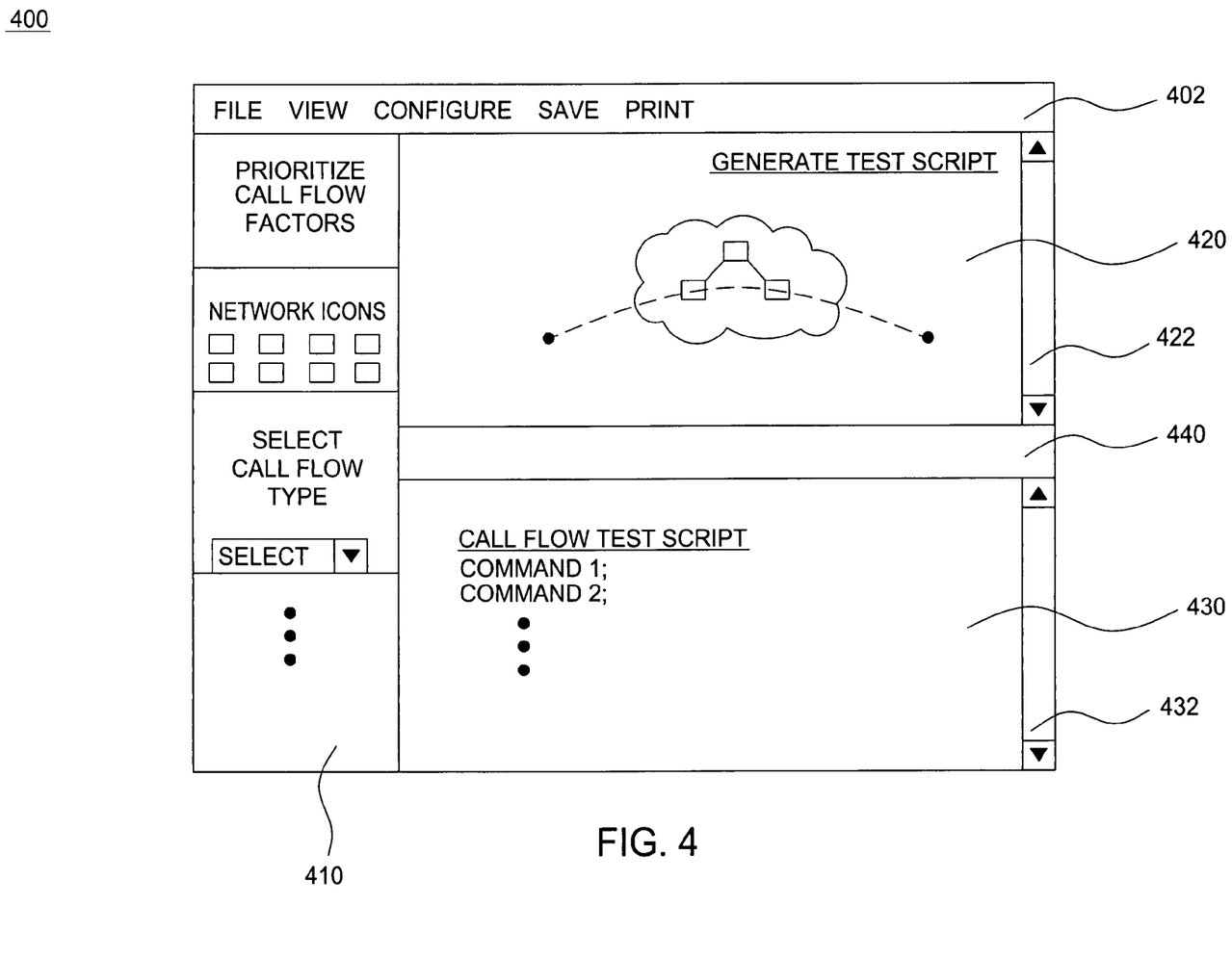
FIG. 4 depicts an exemplary user interface according to the present invention.

FIG. 4 depicts an exemplary user interface according to the present invention. Specifically, exemplary user interface 400 comprises a menu portion (MP) 402, a toolbar portion (TP) 410, a network display portion (NDP) 420, and a test script results portion (TSRP) 430. The NDP 420 and TSRP 430 comprise respective scroll bars 422 and 432. Furthermore, display window adjustor 440 is adjustable for modifying the respective sizes of NDP 420 and TSRP 430. As depicted in FIG. 4, MP 402 comprises standard menu functions as known in the art.

The MP 402 and TP 410 comprise data entry means for entering network design information, prioritizing call flow factors, selecting call flow types, entering call flow design information, specifying call flow actions, and performing like call flow data entry functions. As such, at least one of MP 402 and TP 410 may comprise data entry means for specifying network design information, such as network configuration information, network element information, network connectivity information, and like information. For example, a call flow type may be selectable via a drop-down list, by selecting a radio-button and associated "Submit" button, and like means of selecting and submitting information via a graphical user interface.

In another embodiment, for example, network components may be available from TP 410 such that a user may drag-and-drop the network components from TP 410 onto NDP 420. In another embodiment, the network components available from MP 402 and, optionally, from TP 410 may comprise various network component types and vendor-specific network components. For example, a user may first select a network element type (such as border element, core element, and like network element types) from a first drop-down list. Upon selection of the network element type, a second drop-down list of corresponding vendor-specific equipment within that category is populated, enabling the user to select vendor-specific network elements.

In one embodiment, at least a portion of the automatically generated call flow representation is displayed in NDP 420. Using MP 402 and TP 410, a user may supplement the call flow representation with additional information (e.g., network elements, service elements, call flow actions, quality of service parameters, and the like). In another embodiment, details of the call flow representation may be accessed via NDP 420. For example, a user may be provided with drill-down capabilities such that by double-clicking a network component, service logic representation, and the like, additional information associated with the network component is displayed to the user. In another embodiment, for example, a user may highlight a network component and select an action (e.g., "View Details") from at least one of MP 402 and TP 410.

At least a portion of the processing for automatically generating at least one test script may be initiated via exemplary user interface 400. For example, a user may select a "GENERATE TEST SCRIPT" link, resulting in automatic generation of at least one test script for testing at least one call flow represented in NDP 420. In one embodiment, test script generation results are displayed in TSRP 430. For example, at least one test script generated using the call flow representation in NDP 420 may be displayed. In one embodiment, display of a test script may comprise displaying the specific computer-readable software instructions (commands) generated using the call flow representation.

Although described herein with respect to various means of viewing, selecting, defining, and submitting information, those skilled in the art will appreciate that the means of viewing, selecting, defining, and submitting information may vary based on user interface design, technology type, network type, call flow type, and like parameters. As such, automatic generation of test scripts representative of call flows for testing network service using the methodologies of the present invention may vary based on user interface design, technology type, network type, call flow type, and like parameters.

Figure 5:
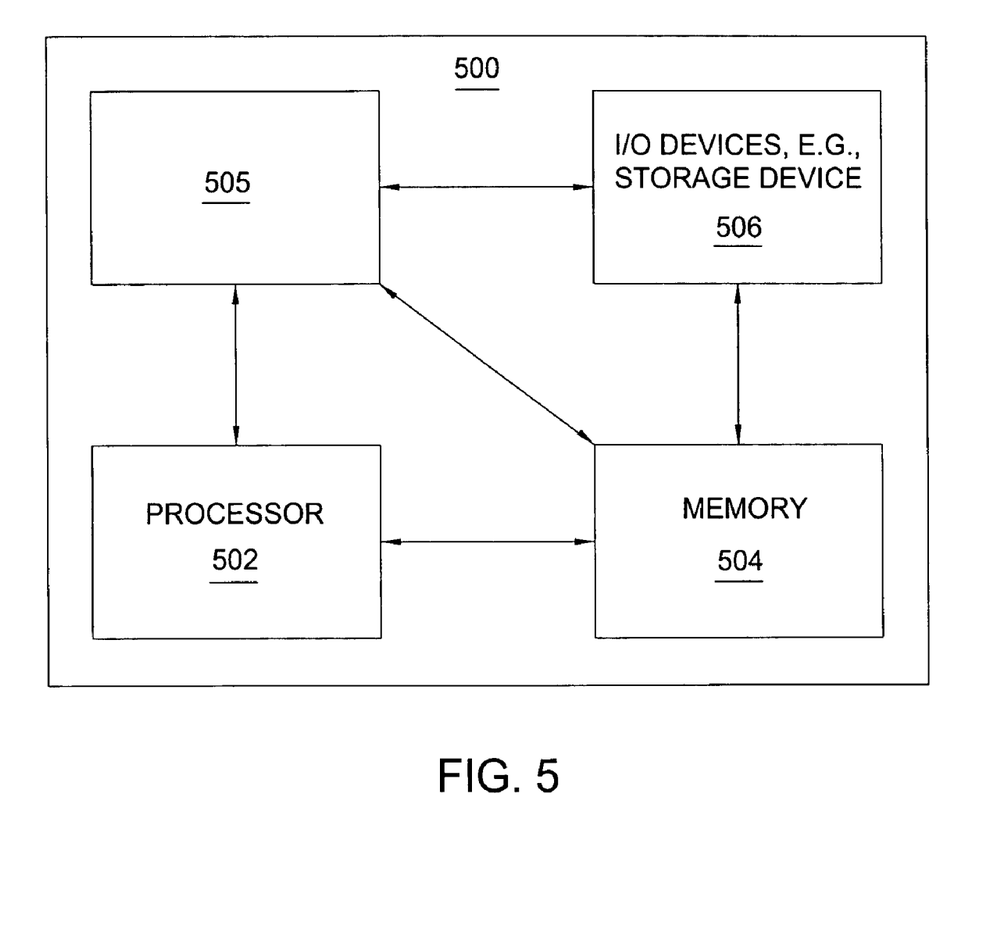
FIG. 5 depicts a high level block diagram of a general purpose computer suitable for use in performing the functions described herein.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a test script generation module 505, and various input/output devices 506 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present test script generation module or process 505 can be loaded into memory 504 and executed by processor 502 to implement the functions as discussed above. As such, the present test script generation process 505 (including associated data structures) of the present invention can be stored on a computer readable medium or carrier, e.g., RAM memory, magnetic or optical drive or diskette and the like.

Although various embodiments which incorporate the teachings of the present invention have been shown and described in detail herein, those skilled in the art can readily devise many other varied embodiments that still incorporate these teachings.

What is claimed is:

1. A method for generating at least one test script for testing at least one service, comprising:
    obtaining information associated with at least one call flow associated with said at least one service;
    automatically constructing a call flow representation using said information, wherein said automatically constructing comprises:
        assessing a priority of at least one factor, wherein said at least one factor comprises at least one of: a call model, a call flow type, a reliability target, or a cost target; and
        constructing said call flow representation in accordance with said priority of said at least one factor; and
    automatically generating said at least one test script, wherein said at least one test script is generated using at least a portion of said call flow representation.

2. A method for generating at least one test script for testing at least one service, comprising:
    obtaining information associated with at least one call flow associated with said at least one service;
    automatically constructing a call flow representation using said information; and
    automatically generating said at least one test script, wherein said at least one test script is generated using at least a portion of said call flow representation, wherein said automatically generating comprises:
        processing said call flow representation for determining at least one call flow action;
        adapting said at least one call flow action for forming at least one command for testing said at least one service; and
        organizing said at least one command for forming said at least one test script.

3. A method for generating at least one test script for testing at least one service, comprising:
    obtaining information associated with at least one call flow associated with said at least one service;
    automatically constructing a call flow representation using said information, wherein said automatically constructing comprises:
        identifying at least one network endpoint associated with said at least one call flow;
        identifying at least one network component associated with said at least one call flow; and
        determining at least one call flow sequence comprising at least one call flow action, said at least one call flow sequence for providing said at least one service to said at least one network endpoint using said at least one network; and component; and
    automatically generating said at least one test script, wherein said at least one test script is generated using at least a portion of said call flow representation.

4. The method of claim 3, wherein said automatically generating comprises:
    processing said at least one call flow sequence for identifying at least one call flow action;
    adapting said at least one call flow action for forming at least one command operable for testing said at least one service; and
    organizing said at least one command for forming said at least one test script.

5. The method of claim 4, wherein said at least one call flow action comprises at least one of: at least one call flow message and at least one call flow process.

6. A computer readable medium storing a software program, that, when executed by a computer, causes the computer to perform a method comprising:
    obtaining information associated with at least one call flow associated with at least one service;
    automatically constructing a call flow representation using said information, wherein said automatically constructing comprises:
        assessing a priority of at least one factor, wherein said at least one factor comprises at least one of: a call model, a call flow type, a reliability target, or a cost target; and
        constructing said call flow representation in accordance with said priority of said at least one factor; and
    automatically generating at least one test script, wherein said at least one test script is generated using at least a portion of said call flow representation.

7. A computer readable medium storing a software program, that, when executed by a computer, causes the computer to perform a method comprising:
    obtaining information associated with at least one call flow associated with at least one service;
    automatically constructing a call flow representation using said information; and
    automatically generating at least one test script, wherein said at least one test script is generated using at least a portion of said call flow representation, wherein said automatically generating comprises:
        processing said call flow representation for determining at least one call flow action;
        adapting said at least one call flow action for forming at least one command for testing said at least one service; and
        organizing said at least one command for forming said at least one test script.

8. A computer readable medium storing a software program, that, when executed by a computer, causes the computer to perform a method comprising:
    obtaining information associated with at least one call flow associated with at least one service;
    automatically constructing a call flow representation using said information, wherein said automatically constructing comprises:
        identifying at least one network endpoint associated with said at least one call flow;
        identifying at least one network component associated with said at least one call flow; and
        determining at least one call flow sequence comprising at least one call flow action, said at least one call flow sequence for providing said at least one service to said at least one network endpoint using said at least one network component; and
    automatically generating at least one test script, wherein said at least one test script is generated using at least a portion of said call flow representation.

9. The computer readable medium of claim 8, wherein said automatically generating comprises:
    processing said at least one call flow sequence for identifying at least one call flow action;
    adapting said at least one call flow action for forming at least one command operable for testing said at least one service; and organizing said at least one command for forming said at least one test script.

10. An apparatus for generating at least one test script for testing at least one service, comprising:

means for obtaining information associated with at least one call flow associated with said at least one service;

means for automatically constructing a call flow representation using said information, wherein said means for automatically constructing comprises:

means for assessing a priority of at least one factor, wherein said at least one factor comprises at least one of: a call model, a call flow type, a reliability target, or a cost target; and means for constructing said call flow representation in accordance with said priority of said at least one factor; and means for automatically generating said at least one test script, wherein said at least one test script is generated using at least a portion of said call flow representation.

* * * * *